April 3, 1962
J. B. JOHNSON
3,028,154
CUTTING AND BEVELLING TOOL
Filed April 12, 1960
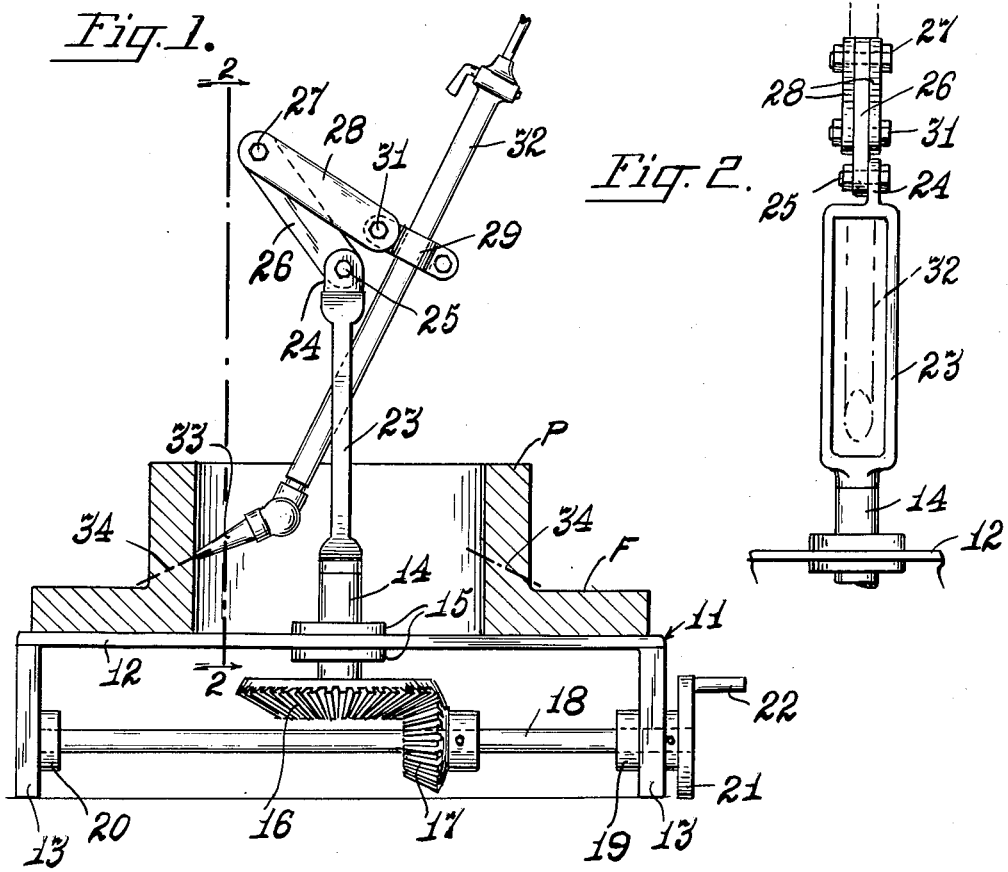
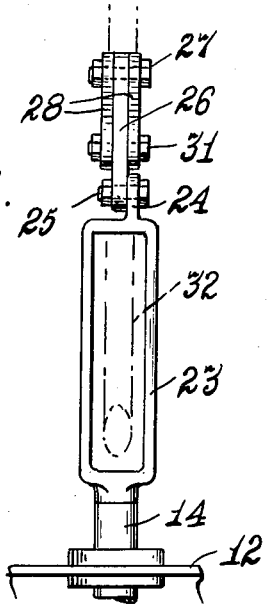
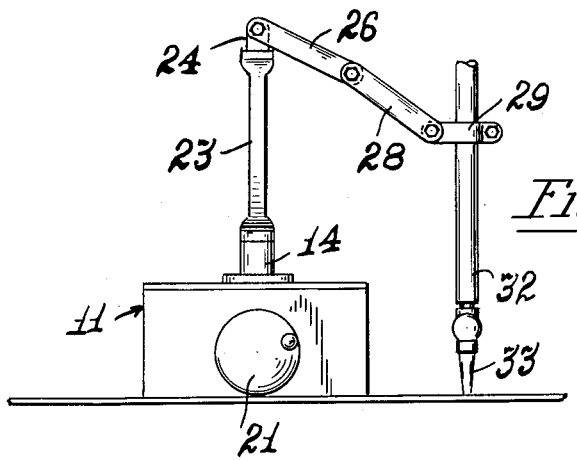
INVENTOR.
John Beeler Johnson United States Patent Office 3,028,154
Patented Apr. 3, 1962

3,028,154
CUTTING AND BEVELLING TOOL
John Beeler Johnson, 611 North West St., Sandwich, Ill.;
Helen M. Johnson, executrix of said John Beeler
Johnson, deceased
Filed Apr. 12, 1960, Ser. No. 21,781
3 Claims. (Cl. 266—23)

This invention relates to improvements in an apparatus for and method of pipe cutting and bevelling.

Pipes having a considerable diameter and having formed integral therewith, either at the time of manufacture, or subsequently thereto as by welding, a flange, valve body or other fittings, are expensive and it is often feasible to reclaim such flanges etc., when the pipe is to be discarded. Such reclaimed flanges are subsequently welded to a section of new pipe. Heretofore, the cutting off of flanges etc., for reuse, has involved the manual application of a cutting device, such as a cutting torch, externally adjacent to the flange. Such practice however, is most unsatisfactory primarily because of the difficulty in maintaining the line of cut in a plane normal to the axis of the pipe. Prior practice also requires subsequent bevelling of the cut edge so as to condition it to be welded to a new pipe section. Such practices are time consuming and costly. The present invention overcomes all of the aforesaid objections to prior practices.

The apparatus of the present invention is concerned with a structure including a universally adjustable mounting clamp assembly adapted to mount and hold the cutting tool, in the present instance, a torch, in position and at an angle to insure cutting of the pipe in a plane normal to its axis and at an angle adapting the cut edge for welding to a new pipe section without further cutting or grinding. The apparatus is mounted on an axis and is constructed to permit the torch to be arranged within the pipe to be cut and, after being locked in the required position, to be advanced around the internal circumference of the pipe at a steady even speed commensurate with the rate of cutting. The apparatus is also useful for performing circular or arched cutting of flat sheet material.

It is therefore an object of the invention to provide an apparatus of the character herein disclosed.

Another object is to provide an apparatus of novel construction for holding a cutting tool in position to cut a surrounding circular wall at an angle and in a circular plane normal to the plane of the axis of said circular wall.

Another object is to provide an apparatus, including a base upon which work to be cut is rested, having universally adjustable means to mount a cutting tool and hold it in a requisite position relative to the work.

Another object is to provide a novel rotatable mounting structure for a cutting tool.

Another object is to provide novel method and means for cutting tubular work pieces.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is an elevational view of the apparatus, showing a flanged pipe section arranged thereon;

FIG. 2 is an enlarged elevational view of the mounting assembly, as seen when viewed substantially along line 2—2 of FIG. 1; and, FIG. 3 is an end elevational view of the apparatus, showing it adjusted for performing a circle cut on a flat sheet.

Referring particularly to the exemplary disclosure in the accompanying drawings, the apparatus includes a base 11 which may be of any suitable construction and includes a top wall 12 and depending side and/or end walls 13 adapted to support the top wall 12 spaced above any supporting surface upon which it may be placed. The top wall 12 has, centrally located therein, a rotatable shaft 14 which is secured against axial displacement as by bearings or collars 15 one arranged on each side of wall 12. The lower extremity of said shaft carries firmly thereon a bevel gear 16 that is meshed at all times with a bevel gear 17 carried firmly on a shaft 18 that is rotatably journalled, as at 19—20, in walls 13. Shaft 18 may be rotated manually, or it may be power driven, so as to impart rotation to shaft 14 for a purpose to be made apparent presently. In the instant disclosure, a hand wheel 21, having an eccentric handle 22, is carried on the end of shaft 18 for manual rotation of said shaft.

The shaft 14 terminates a short distance above plate 12 and has, secured thereto and in axial alignment therewith, an elongated upstanding yoke 23 having spaced, upstanding side arms defining a corresponding elongated opening and terminating in a bearing lug 24 on its upper end. A bolt 25 journals one end of an arm 26 to lug 24, the other end of which is secured pivotally, as by bolt 27, between ends of a pair of parallel links 28 having a clamp bracket 29 journalled, as by bolt 31, to their other ends. It will be observed that said bolts 25, 27 and 31 are each disposed with its axis extending transversely with respect to the plane which extends through the elongated yoke opening and is further at a right angle to the plane passing through the longitudinal axes of the arms of the yoke. It should be quite evident at this time that the links 28, arm 26 and clamp bracket 29 may be moved into any relative position of elevation within the plane of the elongated yoke opening that is possible within the limits of their construction and that, when so adjusted, they may be secured in place by tightening the bolts pivoting the respective sections together.

The clamp bracket 29 is intended to have secured therein a cutting tool, such as the cutting torch 32 illustrated, which, in the FIG. 1 disclosure, includes a tip 33 that is arranged at an angle to the axis of the torch body. As shown, the link, arms and bracket are adjusted in a manner to locate the cutting torch so that it extends in downwardly inclined position through the opening of the yoke 23, and with its cutting tip disposed to the opposite side of the yoke from that of the clamp bracket and close to said yoke. This allows for substantial vertical compact disposition of the assembly in a manner that permits a length of pipe having a flange F thereon to be fitted thereover and seated, with the flanged end down, on the top surface of plate 12. The section of pipe is centered axially with respect to the axis of shaft 14 and the torch is positioned to locate its tip 33 in place against the inside surface of pipe and above flange F. The tip is located at an angle of about 30° relative to the plane of flange F. The apparatus is now ready to be placed in operation so as to torch cut the flange F from the pipe section illustrated, substantially along broken lines 34 in FIG. 1.

In order to accomplish smooth straight line cutting around the pipe circumference, the cutting torch and its mounting is rotated with shaft 14 as its axis. Such rotation is attained by rotating drive shaft 18 by manipulation of hand wheel 21 or by means of a power drive not shown. In either event, rotation of shaft 14 carries the cutting torch tip 33 around the inner circumference of the pipe, cutting the same. The cut off flange has a cut surface that is suitable for immediate association with an end edge, similarly inclined in an opposed direction, on a new pipe section, to define jointly a V-groove for the reception of welding material.

In the FIG. 3 disclosure, the arm links and bracket have been readjusted to position the cutting torch in a substantially vertical position with its cutting tip disposed downwardly. When in this position, the apparatus may be used to perform a circular or an arcuate cut in a piece of sheet material S arranged beneath the base of the apparatus. It should be obvious therefore that the present apparatus is capable of substantially universal adjustment to adapt it for locating the torch tip or other cutting tool mounting therein, in any position required to cut tubular or sheet material in a selected manner and pattern.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. Apparatus for cutting through the wall of a cylindrical body angularly from the inside thereof, said apparatus comprising a hollow base having a supporting surface, a shaft journalled for rotation in said base and adapted to extend upwardly substantially axially through a cylindrical body seated on said supporting surface, an elongated yoke having spaced, upstanding arms defining a correspondingly elongated opening and being integral with and extending upwardly axially from said shaft, a clamp bracket, links interposed between the upper end of said yoke and the clamp bracket and being pivotally connected thereto and to one another by pivots disposed transversely with respect to a plane which extends thru the elongated yoke opening and which is at a right angle to the plane passing through the longitudinal axes of the arms of the yoke whereby said clamp bracket is swingable only in the vertical plane of said elongated opening, said links being capable of releasable angular adjustment with respect to one another and to said yoke and said clamp bracket, whereby to position the latter at different selected positions of elevation, a cutting torch adjustably secured by said clamp bracket, said links and pivotal connections providing for the clamp bracket in one position of elevation thereof securing said cutting torch in position such that it extends in downwardly inclined direction through the elongated opening of the yoke and with its cutting tip disposed to the opposite side of the yoke from the clamp bracket and also close to said yoke, said shaft extending into said base, a pinion on said extending shaft end, and means in said base engageable with said pinion and operable to rotate said shaft to carry the cutting torch along a circular path concentric with the shaft axis.

2. Apparatus for cutting pipe and tubing angularly from the inside thereof, said apparatus comprising a hollow base having a supporting surface, a shaft journalled for rotation in said base and adapted to extend upwardly substantially axially through a work piece seated on said supporting surface, an elongated yoke having spaced, upstanding arms defining a correspondingly elongated opening and being secured firmly to and extending upwardly axially from said shaft, a clamp bracket, links interposed between the upper end of said yoke and the clamp bracket and being pivotally connected thereto and to one another by pivots disposed transversely with respect to a plane which extends thru the elongated yoke opening and which is at a right angle to the plane passing through the longitudinal axes of the arms of the yoke whereby said clamp bracket is swingable only in the vertical plane of said elongated opening, said links being capable of releasable angular adjustment with respect to one another and to said yoke and said clamp bracket, whereby to position the latter at different selected positions of elevation, a cutting torch adjustably secured by said clamp bracket, said links and pivotal connections providing for the clamp bracket in one position of elevation thereof securing said cutting torch in position such that it extends in downwardly inclined direction through the elongated opening of the yoke and with its cutting tip disposed to the opposite side of the yoke from the clamp bracket and also close to said yoke, said shaft extending into said base, and means in said base engageable with and operable by means to rotate said shaft to carry the cutting torch along a circular path concentric with the shaft axis.

3. Apparatus for use in cutting through the wall of a cylindrical body angularly from the inside thereof, said apparatus comprising an elevated supporting surface, an elongated yoke having spaced, upstanding arms defining a correspondingly elongated opening and being journalled for rotation on said surface and adapted to extend upwardly substantially axially through a cylindrical body seated on said surface, a clamp bracket, links interposed between the upper end of said yoke and the clamp bracket and being pivotally connected thereto and to one another by pivots disposed transversely with respect to a plane which extends thru the elongated yoke opening and which is at a right angle to the plane passing through the longitudinal axes of the arms of the yoke whereby said clamp bracket is swingable only in the vertical plane of said elongated opening, said links being capable of releasable angular adjustment with respect to one another and to said yoke and said clamp bracket, whereby to position the latter at different selected positions of elevation, a cutting torch adjustably secured by said clamp bracket, said links and pivotal connections providing for the clamp bracket in one position of elevation thereof securing said cutting torch in position such that it extends in downwardly inclined direction through the elongated opening of the yoke with its cutting tip disposed to the opposite side of the yoke from the clamp bracket and also close to said yoke, and means engageable with and operable to rotate said extension and yoke to carry the cutting torch around the inside perimeter of said body.

References Cited in the file of this patent

UNITED STATES PATENTS

| | | |
|---|---|---|
| 2,054,925 | Bucknam et al. | Sept. 22, 1936 |
| 2,494,698 | Forrest | Jan. 17, 1950 |
| 2,865,625 | Pauley | Dec. 23, 1958 |